(12) United States Patent
Ackermann et al.

(10) Patent No.: US 9,470,189 B2
(45) Date of Patent: *Oct. 18, 2016

(54) CENTRIFUGAL SEPARATOR AND FILTER ARRANGEMENT HAVING A CENTRIFUGAL SEPARATOR OF SAID TYPE

(71) Applicant: MANN+HUMMEL GMBH, Ludwigsburg (DE)

(72) Inventors: Steffen Ackermann, Otterstadt (DE); Volker Greif, Harthausen (DE); Ulrich Muschelknautz, Innsbruck (AT); Michael Kraxner, Landeck (AT)

(73) Assignee: MANN+HUMMEL GMBH, Ludwigsburg (DE)

( * ) Notice: Subject to any disclaimer, the term of this patent is extended or adjusted under 35 U.S.C. 154(b) by 121 days.

This patent is subject to a terminal disclaimer.

(21) Appl. No.: 14/311,677

(22) Filed: Jun. 23, 2014

(65) Prior Publication Data

US 2014/0298761 A1 Oct. 9, 2014

Related U.S. Application Data

(63) Continuation of application No. PCT/EP2012/074230, filed on Dec. 3, 2012.

(30) Foreign Application Priority Data

Dec. 23, 2011 (DE) .......................... 10 2011 122 632

(51) Int. Cl.
*B04C 3/00* (2006.01)
*F02M 35/022* (2006.01)
(Continued)

(52) U.S. Cl.
CPC .......... *F02M 35/0223* (2013.01); *B01D 45/12* (2013.01); *B01D 45/16* (2013.01); *B01D 50/002* (2013.01); *B04C 3/04* (2013.01); *B04C 3/06* (2013.01); *B04C 2003/006* (2013.01)

(58) Field of Classification Search
CPC .... B01D 45/16; B01D 45/12; B01D 50/002; B04C 3/06; B04C 2003/006
See application file for complete search history.

(56) References Cited

U.S. PATENT DOCUMENTS 2,936,043 A * 5/1960 Armstrong ................ B04C 5/06
55/416
3,374,857 A * 3/1968 Hutchins ................... F01N 1/08
181/227

(Continued)

FOREIGN PATENT DOCUMENTS

AT 216481 7/1961
DE 1081424 B 5/1960
(Continued)

Primary Examiner — Dung H Bui
(74) Attorney, Agent, or Firm — James Hasselbeck (57) ABSTRACT

A centrifugal separator for separating particles from a fluid has a housing with an inflow opening and an outflow opening. Guide blades that generate a turbulent flow in a fluid flowing into the housing through the inlet opening are provided. The guide blades each have a leading edge. The leading edge of a first guide blade has a first spacing to a cross-sectional plane of the housing and the leading edge of a second guide blade has a second spacing relative to the cross-sectional plane of the housing, wherein the cross-sectional plane is perpendicular to an inflow direction of the fluid. The first spacing and the second spacing are different from each other. The first and second guide blades each have a length and the lengths differ from each other. Several centrifugal separators can be combined to a filter device.

20 Claims, 9 Drawing Sheets

(51) Int. Cl.
    *B01D 45/16*    (2006.01)
    *B01D 45/12*    (2006.01)
    *B01D 50/00*    (2006.01)
    *B04C 3/06*    (2006.01)
    *B04C 3/04*    (2006.01)

(56) References Cited

U.S. PATENT DOCUMENTS

| | | | |
|---|---|---|---|
| 3,517,821 A * | 6/1970 | Keller | B04C 3/06 209/210 |
| 3,543,485 A | 12/1970 | Hardison | |
| 3,693,329 A * | 9/1972 | Willis | B01D 45/12 138/37 |
| 3,713,280 A * | 1/1973 | Keller | B01D 45/12 260/998.18 |
| 4,008,059 A * | 2/1977 | Monson | B01D 45/14 55/396 |
| 4,985,058 A * | 1/1991 | Prinsloo | B04C 3/00 55/396 |
| 6,540,917 B1 * | 4/2003 | Rachels | B04C 3/00 210/512.1 |
| 7,311,744 B2 * | 12/2007 | Elliott | B01D 45/16 55/396 |
| 8,657,895 B2 * | 2/2014 | Kline | F02C 7/055 55/306 |
| 8,945,266 B2 * | 2/2015 | Yoshimura | F25B 43/02 55/337 |
| 2009/0016872 A1 * | 1/2009 | Anghileri | B64D 33/02 415/121.2 |
| 2009/0314161 A1 * | 12/2009 | Al-Alusi | B01D 45/16 95/271 |
| 2010/0275561 A1 * | 11/2010 | Lundquist | B01D 45/12 55/456 |
| 2012/0037000 A1 * | 2/2012 | Krishnamurthy | B01D 45/16 95/269 |
| 2015/0068174 A1 | 3/2015 | Krisko et al. | |

FOREIGN PATENT DOCUMENTS

GB    2404603    2/2005
WO    2008140307 A1    11/2008

* cited by examiner

CENTRIFUGAL SEPARATOR AND FILTER ARRANGEMENT HAVING A CENTRIFUGAL SEPARATOR OF SAID TYPE

CROSS-REFERENCE TO RELATED APPLICATIONS

This application is a continuation application of international application No. PCT/EP2012/074230 having an international filing date of 3 Dec. 2012 and designating the United States, the international application claiming a priority date of 23 Dec. 2011, based on prior filed German patent application No. 10 2011 122 632.3, the entire contents of the aforesaid international application and the aforesaid German patent application being incorporated herein by reference.

BACKGROUND OF THE INVENTION

The present invention relates to a centrifugal separator and a filter arrangement, for example for filtering combustion air for an internal combustion engine.

Centrifugal separators, also named cyclone filter, cyclone or cyclone separator, serve for separating solid or liquid particles contained in fluids. A fluid flowing into a centrifugal separator is guided such that centrifugal forces accelerate the particles to be separated from the fluid so that the particles can be collected within the separator. One configuration of a cyclone separator is a so-called axial or inline cyclone. An inline cyclone usually comprises a substantially straight tubular housing, called cyclone tube. The air to be cleaned flows through this cyclone tube. For generating the centrifugal forces, in most cases, guide blades are inserted at the inflow end of the cyclone tube, which guide blades generate a helical turbulent flow within the separator housing. Through these swirls, particles contained in the fluid are moved by the centripetal force radially outwards towards the cyclone tube so that the flow radially on the outside has a higher dust content than the flow radially on the inside. Downstream of the guide blade structure, an immersion tube usually extends into the cyclone tube, which immersion tube has a smaller diameter than the cyclone tube. Between the guide blade structure and the immersion tube, a spacing is usually provided in which a helical flow can form and thus the particles can be moved outwards. The portion of the flow radially on the outside with the higher particle content is discharged outside of the immersion tube, and the air cleaned in this manner flows axially through the immersion tube without changing the flow direction.

Axial or inline cyclones can be used, for example, as air filter for combustion air for internal combustion engines. In particular in the case of dust-laden environments in which in particular agricultural or construction machinery is used, cyclone filters or centrifugal separators have been proven to be suitable.

In order to increase the degree of separation of dirt particles from air or fluid, multi-stage filter arrangements have also been proposed in the past. Downstream of a cyclone prefiltration, another purifying filtering using conventional filter media can be carried out, for example. However, this is associated with increased manufacturing expenditure and additional limitations with regard to the installation situation of a corresponding filter arrangement. Thus, it is desirable to improve the filtering capacity of centrifugal separators, in particular when used as an air filter for internal combustion engines.

SUMMARY OF THE INVENTION

It is therefore an object of the present invention to provide an improved centrifugal separator.

Accordingly, a centrifugal separator for separating particles from a fluid is proposed. The centrifugal separator comprises a housing which has an inflow opening and an outflow opening as well as a plurality of guide blades for generating a turbulent flow of fluid flowing in through the inlet opening.

In embodiments of the centrifugal separator, the leading edges of at least two guide blades have a different spacing in relation to a cross-sectional plane of the housing, which cross-sectional plane is substantially perpendicular to an inflow direction of the fluid. The cross-sectional plane can be considered as a reference plane at principally any position along the housing.

It can also be said that at least two guide blades have a different length in the flow direction of the fluid.

Centrifugal separators are to be understood in the following to include also cyclones, cyclone separators, cyclone filters or cyclone dust catchers. The proposed centrifugal separator is in particular configured as an axial cyclone, wherein the housing is tubular or sleeve-shaped, for example, and fluid to be filtered flows substantially along a longitudinal or symmetry axis of the housing through the separator. The particles to be separated are accelerated radially by the generated turbulent flow in the direction towards the outer housing wall and can be removed there. Studies of the applicant have shown that in comparison with conventional guide blade arrangements, in which the guide blades have the same length, a centrifugal separator achieves better degrees of separation if the resulting guide blade apparatus is provided with blades of different lengths, or if the leading edges are at different positions.

When flowing through the centrifugal separator, the inflowing fluid, such as particle-laden air, first impinges on the leading edge(s) of one or more first guide blades, and subsequently on the leading edge(s) of one or more further guide blades.

For example, one of the plurality of guide blades is shortened in the region of the inflow opening. This means that in the case of differently long blades, inflowing fluid flows a different distance along the guide blade, depending on the respective guide blade. As a result, the flow profile and the flow dynamics are positively influenced with regard to the degree of separation and the pressure loss of the centrifugal separator. Overall, this results in a more efficient flow separator and advantageous flow conditions within the housing which result in the high degree of separation of particles.

For example, on the inflow side, at least two guide blades have a different distance from the inflow opening in the flow direction of the fluid. The number of guide blades can be an even or odd number. In the case of a centrifugal separator provided with three guide blades, it is sufficient to make one guide blade shorter, for example along the axis of the centrifugal separator, so as to achieve an improved degree of separation.

In embodiments of the centrifugal separator, the guide blades extend between an axial core and a housing wall of the housing. The core extends, for example, in collinear alignment with a longitudinal axis or symmetry axis of the housing. The housing, in particular in certain sections, can be sleeve-shaped or tubular. The axial core has then in general a predetermined diameter. A width of the resulting guide blades is then defined by the diameter of the core and also by the inner diameter of the housing.

In embodiments of the centrifugal separator having a sleeve-shaped or tubular housing, the guide blades and the axial core form a cylindrical guide blade apparatus that is inserted into the housing. Thus, the guide blade apparatus can preferably be fitted or inserted with guide blades of different lengths into different housings.

The guide blades are in general stationarily arranged. However, conceivable are also rotatable or movable guide blades in order to generate a turbulent flow or a swirled flow in an expedient manner.

A core diameter preferably ranges between 10 and 20 mm. Particularly preferred, a core diameter between 14 and 17 mm is implemented. Through the size of the core diameter, the flow properties within the housing of the centrifugal separator can be optimized.

In embodiments of the centrifugal separator, the thickness of at least one guide blade changes from the core towards the housing wall. The guide blades which can be wound, for example, in a propeller-, worm- or screw-like manner around the core, can be modeled with regard to their thickness. For example, the thickness of a respective guide blade between the core and the housing wall can first increase and can subsequently decrease again towards the housing wall. By means of a suitable thickness profile, swirl formation or flow properties of the fluid can be improved.

Alternatively or additionally, in further embodiments of the centrifugal separator, the thickness of at least one guide blade changes along its length. Length is substantially to be understood as the distance that a particle travels along the guide blade when said particle flows through the centrifugal separator or is carried by the fluid flow. The length of the guide blade is generally proportional to the height of the guide apparatus. Also, by varying the thickness of the guide blades along their length, the flow properties can be adjusted in an advantageous manner.

In further embodiments of the centrifugal separator, a blade angle of at least one guide blade changes along its length. A respective guide blade has a leading side or leading edge and a trailing side or trailing edge on the other side, wherein the blade angle can refer in particular to a longitudinal axis of the centrifugal separator or housing. The blade angle at a location of the guide blade is the angle that is enclosed between a tangential area and the longitudinal axis of the guide apparatus or centrifugal separator. For example, on the inflow side, thus in the direction towards the inflow opening of the centrifugal separator, the inflow angle is smaller than on the outflow side, thus in the direction towards the outflow opening. As a further angle value, an angle of attack can also be determined in relation to a circumferential line or a cross-section perpendicular to the symmetry axis or longitudinal axis of the centrifugal separator. The sum of blade angle and angle of attack at a location of a guide blade is 90 degrees.

By changing the angle of attack, the flow properties in the centrifugal separator can be improved.

Embodiments of the centrifugal separator can furthermore provide that an inflow profile of at least one guide blade is wavy or curved. For example, the inflow profile which follows the shape of the leading edge can be non-linear. In particular, in the case of a guide apparatus with guide blades of different lengths, a different length of guide blades can be approximated by means of the inflow profile.

Preferred embodiments of centrifugal separators comprise exactly six guide blades. However, conceivable are fewer blades in order to generate a lower pressure loss when the fluid passes through the centrifugal separator. Studies of the applicant have shown that the more blades are used, the shorter the guide apparatus can be made at predetermined degrees of separation.

Furthermore, studies of the applicant have shown that a mean angle of attack between 40° and 50° with respect to a cross-sectional area perpendicular to the longitudinal axis is particularly advantageous. Furthermore, a spread between the angle of attack at the core and the housing wall can range between 25° and 35°. For example, the blade angle of attack is approximately 60° at the core and 29° at the housing wall.

Preferably, the guide blades do not overlap on any cross-sectional area perpendicular to an inflow direction. In this manner, there is always at least a small gap between adjacent guide blades. This facilitates manufacturing, in particular when using an injection molding method, because no complicated undercuts occur. Thus, the resulting centrifugal separator can be produced in a particularly cost-effective manner. Suitable materials are in particular plastics, and in individual cases metal or other materials adapted to the installation situation and the operating temperature.

In embodiments of the centrifugal separator, the core is longer than the guide blades. For example, the core can protrude in the direction towards the inflow opening of the housing or can also form a trailing hub in the direction towards to the outflow opening. The preferably rotationally symmetric core, for example, can taper in the direction of the fluid flow and can influence the flow properties. For example, a ratio of the core diameter and a core spacing between the housing wall and the core is between 2 and 4. The core spacing between the core and the housing wall can also be designated as width of the guide blades.

In further embodiments, the cross-sectional area of the housing changes along the flow direction. For example, the cross-sectional area increases along the longitudinal axis from the inflow opening towards the outflow opening. This can result in a conical shape of the housing. Also, the housing can be conical in certain sections. For example, the guide apparatus is arranged in a sleeve-shaped or cylindrical region of the housing, and the outflow region in which the turbulent flows act on the fluid has a conically widening shape towards the outflow opening. An opening angle of the cone preferably ranges between 2° and 6°.

Optionally, the centrifugal separator can comprise an immersion tube which is provided in the housing and extends in the direction towards the inflow opening. The immersion tube can be formed in a tubular or sleeve-shaped manner. Preferably, the immersion tube is provided with a cross-section that tapers towards the inflow opening. The immersion tube that protrudes into the housing preferably has a diameter that is smaller than that of the housing or the cyclone tube. More preferably, a spacing in the axial direction is provided between the guide blades and the immersion tube. This has the advantage that a helical flow can form there, and in this manner, the particles can be moved towards the outside without requiring a change in the overall flow direction. Thus, a low pressure loss can be achieved.

In particular a combination of an immersion tube that tapers conically in the direction towards the inflow opening and of a conically shaped housing section in the region of the immersion tube or the outflow opening results in particularly beneficial flow conditions and degrees of separation of the centrifugal separator.

In preferred embodiments of the centrifugal separator, the immersion tube is secured at the outflow opening by means of an immersion tube plate. For example, the immersion tube plate closes off the outflow opening of the housing together with the immersion tube. In this case, the immersion tube plate is implemented, for example, as a circular ring with an outer diameter that corresponds to the outflow opening, and with an inner diameter that corresponds to an edge of the immersion tube.

Furthermore, in some embodiments, the centrifugal separator is provided with a particle discharge opening. The particle discharge opening preferably opens a predetermined angular section in the housing wall with regard to a longitudinal axis of the housing. Furthermore, the particle discharge opening has a discharge opening or discharge window depth. Said depth is measured, for example, along the longitudinal axis of the housing.

Preferred embodiments of the particle discharge window have a depth between 10 and 20 mm, and particularly preferred between 13 and 15 mm. The opening angle of the particle discharge window preferably ranges between 60° and 90°. Particularly preferred, the opening angle ranges between 75° and 85°.

Furthermore, a filter device is proposed. The filter device comprises a plurality of centrifugal separators with one or more features as described above. The centrifugal separators are provided in a filter device housing of the filter device, which filter device housing comprises a plurality of filter device housing openings as inlets communicating with the inflow openings of the centrifugal separators, and comprises an outflow section that is separated from the openings in a fluid-tight manner. The outflow openings of the centrifugal separators are coupled to the outflow section. Thus, a plurality of centrifugal separators can be filtered in parallel for cleaning, for example, combustion air for internal combustion engines. By means of the parallel arrangement of the centrifugal separators, the degree of separation and the pressure loss can be adjusted when fluid passes through the filter device.

In embodiments of the filter device, a discharge section is provided that is separated in a fluid-tight manner from the inflow openings and the outflow section. The discharge section is communicatively connected to the particle discharge windows of the centrifugal separators. Thus, a region is provided that is sealed in a fluid- and dust-tight manner and serves for discharging the separated particles.

Further possible implementations of the invention comprise also combinations, which are not explicitly mentioned, of features or embodiments of the centrifugal separator or the filter device that have been described above or in the following with regard to the exemplary embodiments. The person skilled in the art will also add or modify individual aspects as improvements or supplements to the respective basic form of the invention.

Further configurations of the invention are subject matter of the dependent claims and the exemplary embodiments of the invention described hereinafter. In the following, the invention is explained in more detail by means of exemplary embodiments with reference to the attached Figures.

BRIEF DESCRIPTION OF THE DRAWINGS

FIG. 16a shows a perspective illustration of a third embodiment of a centrifugal separator and FIG. 16b the corresponding section view of an embodiment of the guide apparatus along the section line indicated in FIG. 16a.

FIG. 17a shows a perspective illustration of the third embodiment of a centrifugal separator and FIG. 17b a corresponding section view of the guide apparatus along the section line indicated in FIG. 17a.

FIG. 18a shows a perspective illustration of the third embodiment of a centrifugal separator and FIG. 18b a corresponding section view of the guide apparatus along the section line indicated in FIG. 18a.

In the Figures, same reference numbers designate same or functionally identical elements unless otherwise stated.

DESCRIPTION OF PREFERRED EMBODIMENTS

Figure 1:
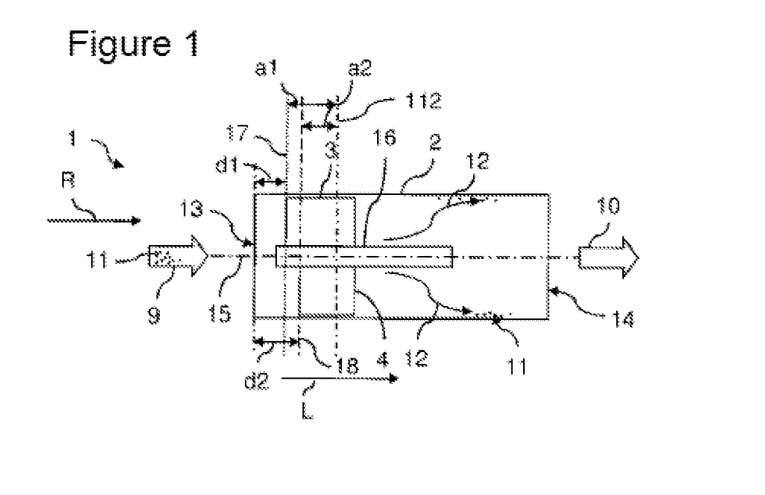
FIG. 1 shows a schematic longitudinal sectional view of an embodiment of a centrifugal separator.
Figure 2:
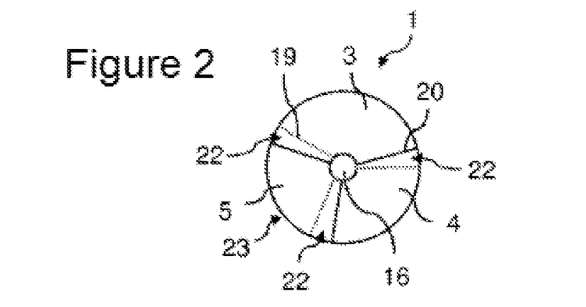
FIG. 2 shows a schematic cross-sectional view of the embodiment of a centrifugal separator.
Figure 3:
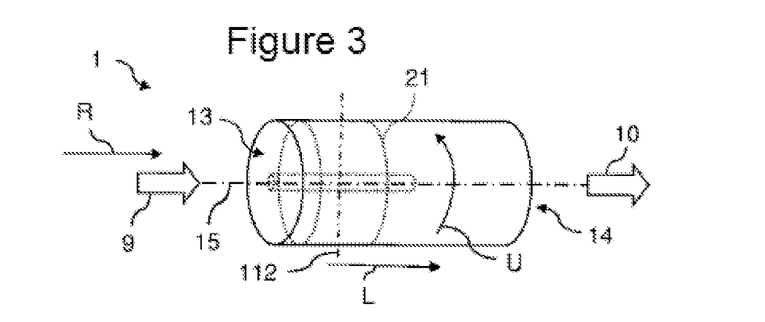
FIG. 3 shows a perspective schematic view of the embodiment of a centrifugal separator.

FIG. 1 shows a schematic longitudinal section view of an embodiment of a centrifugal separator. FIGS. 2 and 3 show cross-section views and perspective views of the embodiment.

In a centrifugal or cyclone separator, particles are removed from a fluid laden with particles. This is indicated in FIG. 1 by an arrow representing a raw fluid flow 9. The raw fluid 9, for example air for an internal combustion engine, can contain dust or other particles 11. After passing through a suitable centrifugal separator 1, that is configured, for example, as an axial cyclone, purified air or fluid 10 flows out.

The centrifugal separator 1 has a substantially cylindrical housing 2. The housing 2 or the centrifugal separator 1 has a longitudinal axis 15 which, in the embodiment of the FIGS. 1 to 3, corresponds also to a symmetry axis. On the inflow side, an inflow opening 13 is provided, and an outflow opening 14 is provided on the outflow side. In the centrifugal separator 1, a swirl is generated in the housing 2 by suitable flow guidance, as a result of which the particles in the air are subjected to centrifugal forces. This means, the particles are driven radially outwards in the direction towards the cylindrically shaped housing wall 23 (cf. FIG. 2). There, as indicated in FIG. 1, they can accumulate and can be removed.

For generating the swirl-shaped flow and thus radial forces acting on the particles 11, a guide apparatus with suitable guide blades 3, 4 is provided. The guide blades 3, 4 can be wound, for example, in a screw-shaped or propeller-shaped manner about the axis 15 of the centrifugal separator 1. This is also referred to as axial cyclone. In the illustration of FIG. 1, a core 16 is provided along the longitudinal axis 15 at least in a section in the vicinity of the inflow opening 13. The core 16 is secured by the guide blades 3, 4 illustrated in the FIGS. 1 and 2. The guide blades 3, 4 cause the turbulent flow, which is indicated by means of the arrows 12. Particles or fluid guided from the inflow opening 13 to the outflow opening 14 flow(s) along the guide blades 3, 4.

In the perspective illustration of FIG. 3, the sleeve-shaped or tubular housing 2 with the inflow opening 13 and the outflow opening 14 can be seen. The core 16, also shown in FIG. 1, and the guide blades 3, 4 form in particular a guide apparatus 21. The guide apparatus 21 can be approximated with a cylindrical shape, which is illustrated in FIG. 3 by dotted lines.

FIG. 2, which illustrates a cross-sectional view of the centrifugal separator, shows the core 16 in the center and the circular housing wall 23. In the cross-sectional view of FIG. 2, three guide blades 3, 4, 5 are shown, each of which has a leading edge or an inflow profile 20 and a trailing edge or an outflow profile 19. In FIG. 2, only the guide blade 3 is provided with reference numbers with regard to its leading edge 20 and trailing edge 19. In embodiments, the guide blades or the guide blade apparatus 21 is configured in such a manner that in a cross-section, thus a view in the direction of the housing axis 15, no guide blades overlap each other. This means, between a leading edge 20 and a trailing edge 18 of adjacent guide blades, for example between 3 and, 4 and 5, and 5 and 3, a gap 22 is formed. Thus, the entire centrifugal separator 1 can be implemented in a simple manner as one monolithic piece from a single material. In particular, an injection molding method can be used. However, undercuts are principally also conceivable, thus circumferential guide blades.

Figure 4:
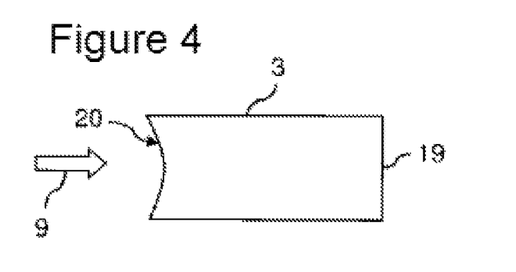
FIG. 4 shows a schematic illustration of an embodiment of a guide blade.

In FIG. 4, a schematic illustration of a guide blade is shown. The arrow 9 indicates the inflow direction of raw fluid. The guide blade 3 comprises a leading edge 20 and a trailing edge 19. The strip-shaped guide blade 3 is arranged helically or spirally about a respective core 16, as indicated in the FIGS. 1 to 3.

A dimension for the length L of the guide blades 3, 4 is indicated in FIG. 1. The length L of a guide blade 3, 4 can be, for example, the distance which a particle travels on a surface of a guide blade from the inflow side to the outflow side. The embodiment in FIG. 1 is provided with guide blades 3, 4 of different lengths. This means, the guide blade 3 begins at a distance d1 from the inflow opening 13 and extends in the direction towards the outflow opening 14. The second guide blade 4 illustrated in FIG. 1 extends at a distance d2, which is greater than d1, from the inflow opening 13 in the direction towards the outflow opening 14. The dotted line 17 and the dotted line 18 show in cross-section of FIG. 1 the respective leading edge position of the guide blades 3 and 4, respectively, in relation to the inflow opening 13.

In the FIGS. 1 and 3, a cross-sectional area or cross-sectional plane 112 is indicated by a dot-dashed line, wherein the cross-sectional plane 112 is perpendicular to the longitudinal axis 15 of the housing 2 and thus is also substantially perpendicular to an inflow direction R of the raw air 9, which is indicated by the arrow R. A corresponding cross-sectional plane can be assumed at any position along the housing axis 15 and serves, for example, as a reference plane for the leading edges 20 of the guide blades 3, 4. It can be seen, for example, that the leading edge 20 of the guide blade 3 has a spacing a1 from the cross-sectional plane 112, and the leading edge 20 of the guide blade 4 has a spacing a2<a1. In other words, in the illustrated embodiment of the centrifugal separator 1, the leading edges 20 of at least two guide blades 3, 4 have a different spacing a1 and a2, respectively, in relation to a cross-sectional plane 112 of the housing 2, which is substantially perpendicular to an inflow direction R of the raw air 9.

Studies of the applicant have shown that by differently arranged leading edges 20 or differently long guide blades 3, 4, for example in relation to a distance from the inflow opening 13, improved separation properties can be achieved in centrifugal separators 1.

In order to explain the geometry and configuration of the guide blades 3, 4 in more detail, the respective profile along the circumference U in relation to the length L, thus the extent of the guide blades in the flow direction, can be illustrated.

FIGS. 5 to 8 show schematic length profiles of guide blades. The dashed line 17 shows the position of guide blade that begins closest to the inflow opening. In FIGS. 5-8, the bold (diagonal or curved) lines indicate guide blades along the circumference and their length or the height of the guide blade apparatus. Furthermore, the plane 112 is illustrated by a dot-dashed line, as well as the associated spacings a1 and a2. FIG. 1 shows four guide blades of equal length for generating swirls in the fluid flow. Improved separation of particles can be achieved in centrifugal separators if the guide blades have different lengths or if the leading edges are differently spaced towards the inflow opening 13 or are differently spaced in relation to a drawn plane 112.

Figure 5:
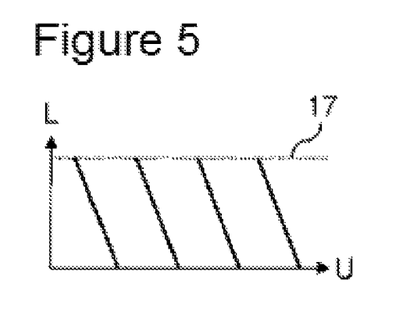
FIG. 5 shows schematic longitudinal profiles of a first guide blade configuration.
Figure 6:
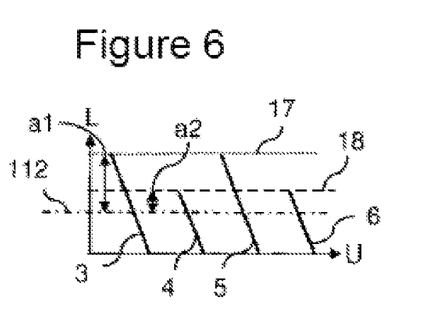
FIG. 6 shows schematic longitudinal profiles of a second guide blade configuration.

For example, FIG. 6 illustrates a possibility in which the four guide blades 3, 4, 5, 6 have in each case alternately a different length. Again, the dashed line 17 and a dashed line 18 as a cross-sectional line perpendicular to the longitudinal axis are illustrated in each case in the direction of the longitudinal axis 15 offset in the flow direction, and a dot-dashed plane 112 is illustrated. The guide blades have alternately a different length. In relation to the inflow opening 13, the guide blades 3 and 5 begin at the same cross-sectional area 17. The guide blades 4 and 6 located therebetween have a shorter length and begin in the direction of the longitudinal axis 15 offset in the direction of the fluid flow at the cross-sectional area 18. Thus, in each case a long (3, 5) and a short (4, 6) guide blade are alternately provided. The guide blades illustrated in the FIGS. 5 and 6 are substantially straight.

Figure 7:
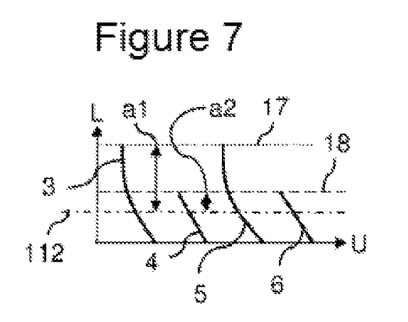
FIG. 7 shows schematic longitudinal profiles of a third guide blade configuration.

Additional improvement of the flow properties can be achieved when the guide blades are curved. This is illustrated in FIG. 7. The guide blades 3 and 5, which are longer than the guide blades 4, 6, have a curved contour along the length L. It is qualitatively apparent that the blade angle in relation to a fluid flow direction or the longitudinal axis 15 of the guide blades 3 and 5 is flatter towards the leading edge than towards the trailing edge.

Figure 8:
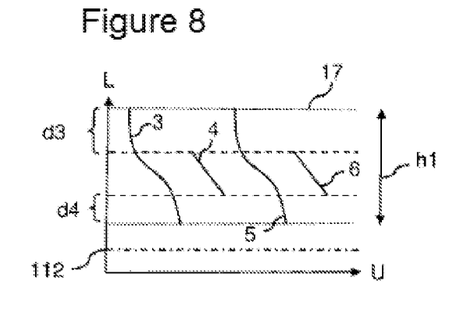
FIG. 8 shows schematic longitudinal profiles of a fourth guide blade configuration.

FIG. 8 shows another possibility of configuring guide blades differently with regard to their length. Again, an example with four guide blades 3, 4, 5, 8 is shown. The leading edges of the guide blades 3 and 5 begin at the same cross-sectional area 17. The leading edges of the guide blades 4, 6 therebetween are offset by an offset d3 in the direction of the flow. Furthermore, the trailing edges of the guide blades 3 and 5, and 4 and 6, respectively, are offset by an offset d4. Thus, in each case two small guide blades 4, 6 are arranged between long guide blades 3, 5. Overall, this can be referred to as height h1 of the resulting guide blade apparatus together with the core. Furthermore, FIG. 8 shows that the guide blades 3 and 5 are curved, whereas the guide blades 4 and 6 have a substantially straight shape. In particular the different configuration of the guide blades with respect to each other results in a particularly good particle separation or flow guidance within the housing of a centrifugal separator.

Figure 9:
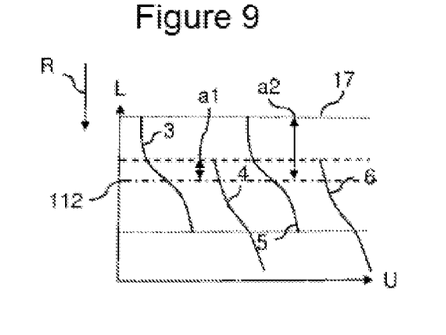
FIG. 9 show schematic longitudinal profiles of a fifth guide blade configuration.

In FIG. 9, a centrifugal separator version is illustrated in which the guide blades 3, 4, 5, 6 have the same length, but the leading edges have alternately different spacings a1, a2 with regard to the cross-sectional area 112. For example, in the orientation of FIG. 9, the inflow direction R extends from top to bottom.

Figure 10:
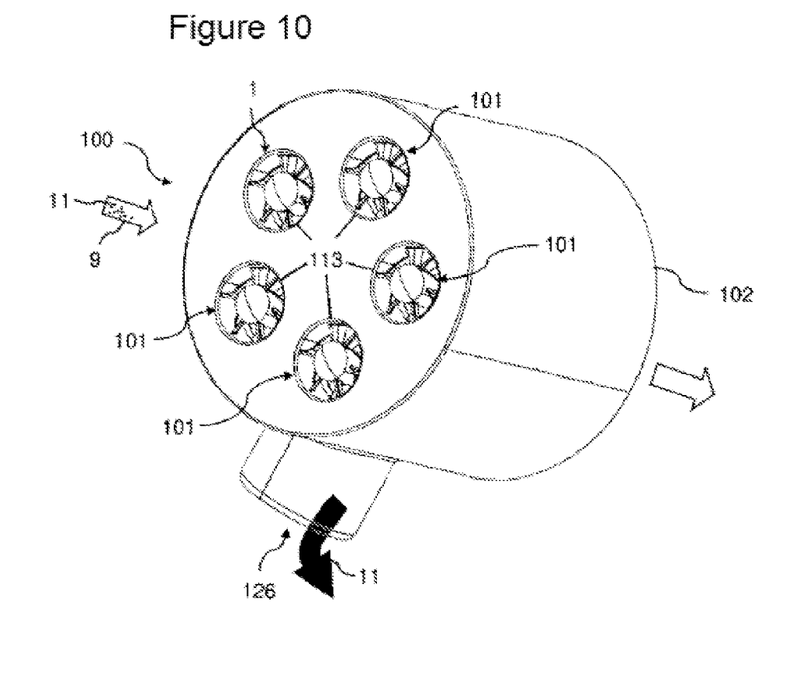
FIG. 10 shows a perspective view of an embodiment of a filter device with centrifugal separators.
Figure 11:
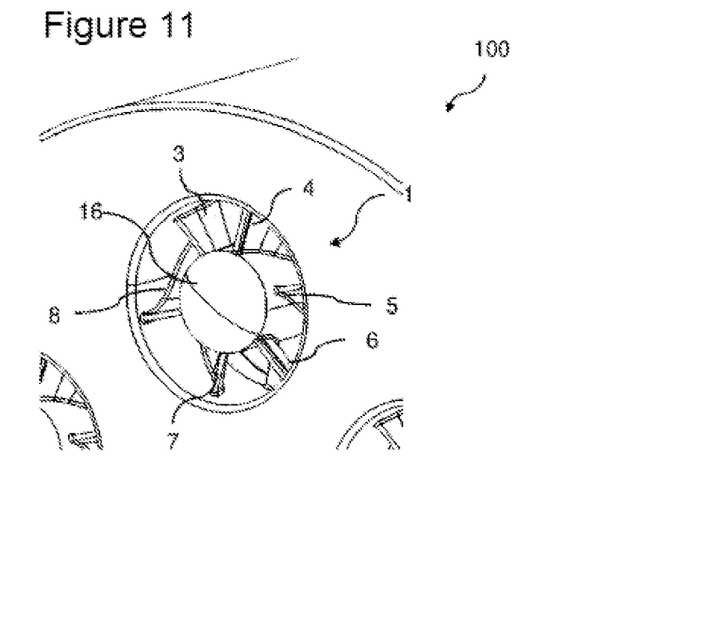
FIG. 11 shows a detail view of a cutout of the embodiment of a filter device with centrifugal separators.
Figure 12:
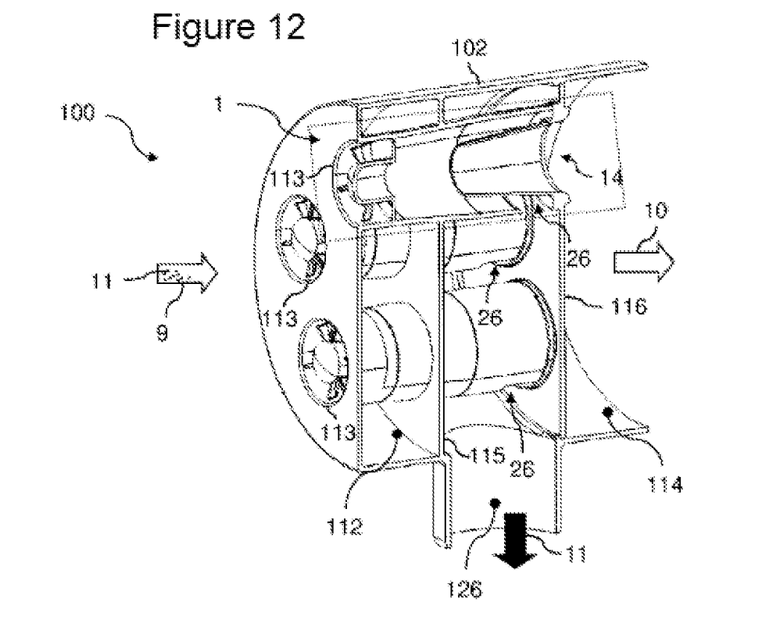
FIG. 12 shows a sectional view of the embodiment of a filter device with centrifugal separators.

A plurality of centrifugal separators according to the above-described embodiments can be connected in a common housing so as to form a filter device. In FIGS. 10 to 12, embodiments of a filter device with centrifugal separators are illustrated. FIG. 10 shows a perspective view of an embodiment, FIG. 11 shows a detail view of a centrifugal separator inserted therein, and FIG. 12 shows a cross-section view of an embodiment of a filter device.

A filter device 100 comprises a filter device housing 102 in which a plurality of centrifugal separators 1, 101 are integrated. In the orientation of FIGS. 10 and 12, the inflow of particle-laden raw fluid 9 takes place from the left. Purified fluid 10 flows out on the right. Separated particles can be removed in the downward direction, as indicated by the black arrow 11. The filter device housing 102 is provided with a plurality of filter device housing openings 113 in which inflow openings 13 of the centrifugal separators 1, 101 are fitted. A particle discharge opening 126 discharges in downward direction from the filter device housing 102. It is apparent from the detail view of FIG. 11 that the inserted centrifugal separators 1 comprise a central core 16 and are provided with six guide blades 3, 4, 5, 6, 7, 8. It can be seen in the detail view of FIG. 1 that the guide blades 5, 7 and 3 are shorter than the guide blades 4, 6 and 8.

Figure 13:
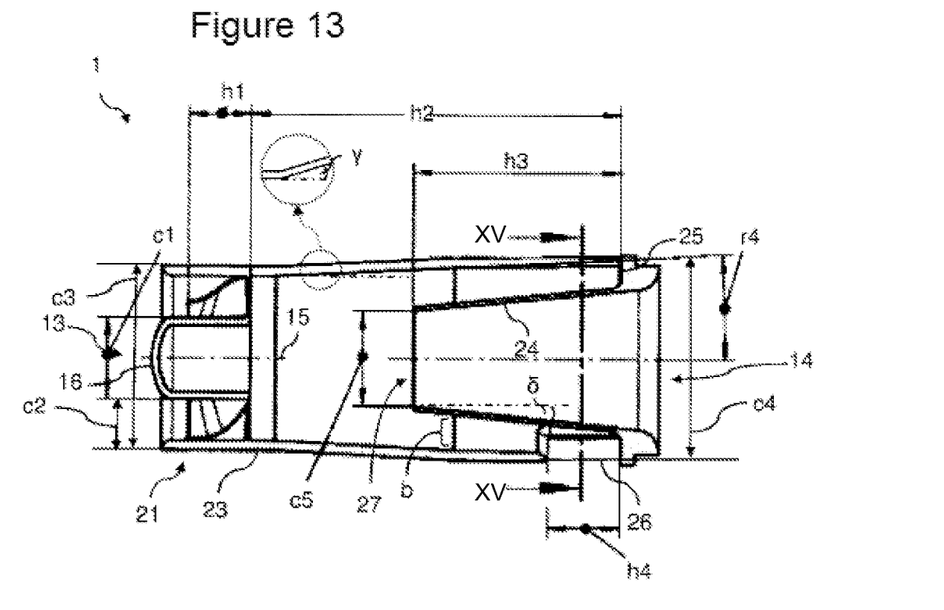
FIG. 13 shows a longitudinal sectional view of a second embodiment of a centrifugal separator with exemplary dimensions.

In the cross-sectional view of FIG. 12, a centrifugal separator 1 (dotted rectangular region) is indicated in cross-section. In FIG. 13, a detail illustration of the corresponding sectional view of an embodiment of a centrifugal separator is shown. The filter device 100 includes substantially three regions. A holding region 112 carries or holds the regions of the guide blade apparatuses of the centrifugal separators 1, 101. The outflow openings 14 of the centrifugal separators 1, 101 lead into a common outflow section 114. The outflow section 114 is separated from a discharge section 126. The centrifugal separators 1, 101 are provided with particle windows 26 that are communicatively connected to the discharge section 126. On the inflow side, polluted air, for example combustion air, enters the centrifugal separator 1, 101 through the openings 113, flows through the centrifugal separators which discharge the particles at the particle discharge windows 26, and purified air exits through the outflow openings 14 into the outflow section 114. The purified air 10 can now be fed to an internal combustion engine, for example. In relation to the gravitational acceleration, which is directed downwards in the orientation of FIG. 12, the orientation of the discharge windows 26 is the same. Thus, the particles fall downwards through the discharge section 126 due to gravity and can be transported away. The parallel arrangement of centrifugal separators enables adjustment of the resulting pressure losses and degrees of separation.

A corresponding filter device 100 achieves an even better filtering effect when the pressure at the discharge section 126 is lower with respect to the pressure at the inflow openings 113. For example, the discharge section that is configured as a suction nozzle can be connected to a suction device that collects and removes the dust.

Figure 14:
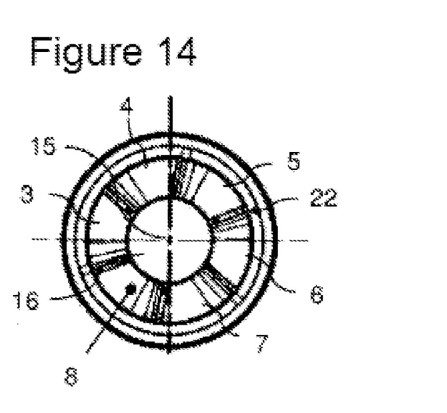
FIG. 14 shows a cross-sectional view of the second embodiment of the centrifugal separator.
Figure 15:
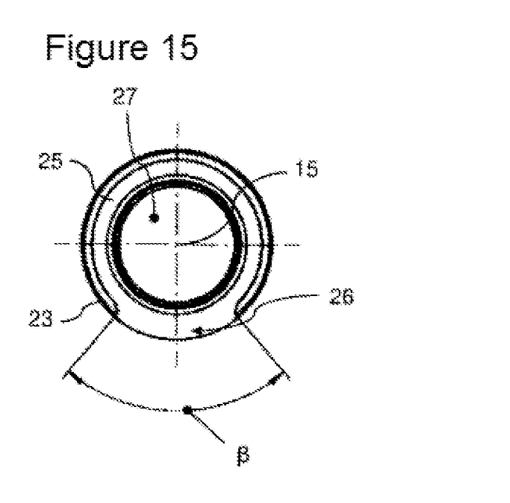
FIG. 15 shows a cross-sectional view of the second embodiment of the centrifugal separator.

The FIGS. 13, 14 and 15 show a second embodiment of a centrifugal separator in a longitudinal section and a cross-section. Furthermore, exemplary dimensions are shown in the Figures. The longitudinal section of FIG. 13 shows the centrifugal separator 1 with a housing made of a housing wall 23 which has cylindrically and conically shaped sections. On the inflow side (left), an inflow opening diameter c3 is indicated. On the outflow side (right), an outflow opening diameter c4 is shown. In the flow direction that is oriented from left to right in FIG. 13, the diameter of the housing increases. Thus, a cross-sectional area increases from the inflow opening towards the outflow opening.

FIG. 13 shows additionally an outflow opening radius r4, wherein r4=0.5c4. A guide apparatus 21 is provided in the region of the inflow opening 13. The guide apparatus 21 has a height h1. The height h1 of the guide apparatus 21 is to be understood in relation to the longitudinal axis 14 as a section in which the guide blades extend around the core 16. The core 16 has a core diameter c1. The width of the guide blades c2 is to be understood as the spacing between the core 16 and the housing wall 23. Thus, this results in a guide blade width c2=0.5c3–c1.

From the outflow opening 14, a conical immersion tube 24 extends into the interior of the housing 23. The immersion tube 24 is fastened by means of an immersion tube plate 25 that is coupled to the outflow opening 14 of the housing 23. The immersion tube 24 extends with an immersion depth h3 from the outflow opening 14 or the immersion tube plate 25 in the direction towards the guide apparatus 21. The immersion tube 24 has a conical shape. Furthermore, this region of the housing or the housing wall 23 has a conical geometry. In FIG. 13, the angles λ and δ are indicated. The angle λ indicates the angle of the housing wall 23 in relation to the longitudinal axis 15. The angle δ shows the angle that is enclosed by the immersion tube 24 and the longitudinal axis. Angles between 2° and 6° for λ or δ have proven to be advantageous. Due to the conical arrangement of the housing section and also the immersion tube plate, advantageous flow guidance is possible.

Furthermore, the housing wall 23 has a particle discharge window 26 in its end region. The particle discharge window 26 extends with a discharge window depth h4 along the longitudinal axis 15. In FIG. 15, a section along the line XV-XV is indicated. The particle discharge window 26 defines an angular range β with regard to the longitudinal axis 16. Thus, the particle discharge window opens an angular section β in the housing wall 23. FIG. 14 shows a cross-sectional view through the guide apparatus 21. Similar to FIG. 2, six guide blades 3-8 are shown, wherein there is a gap 22 between each of the guide blades in the cross-sectional view of FIG. 14. Thus, the guide blades do not overlap.

FIG. 13 furthermore shows a gap width b, i.e., a spacing between the immersion tube 24 and the housing wall 23 at a predetermined cross-section perpendicular to the longitudinal axis 15. The smallest diameter of the immersion tube is designated by c5. Thus, the immersion tube 24 shifts the outlet opening by the immersion depth h3 in the direction towards the interior of the housing 23. It has been found that a discharge window depth between 10 and 20 mm and an opening angle between 70° and 90° is advantageous. An immersion depth h3 of the immersion tube 24 ranges advantageously between 30 and 50 mm. An immersion tube diameter c5 can be selected to range between 16 and 20 mm. A spacing between the immersion tube plate 25 and the guide apparatus 21 is designated by h2 and ranges preferably between 60 and 80 mm. A core diameter c1 is preferably selected to range between 12 and 18 mm. The angle λ of the conical section of the housing wall 23 is preferably less than 4° so as to avoid flow separation.

Figure 16A:
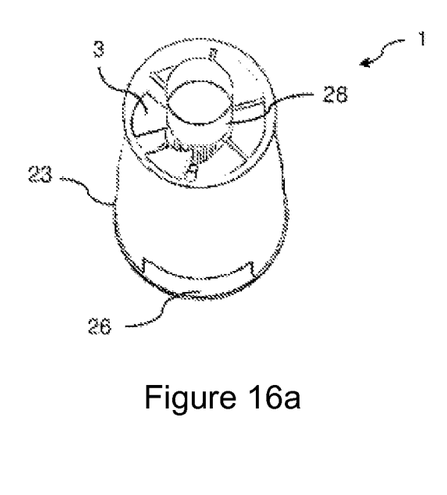

Degrees of separation and pressure losses can also be set in an advantageous manner by the geometry and shape of the guide blades. In FIGS. 16a, 16b to 18a, 18b, perspective illustrations of centrifugal separators and sectional views of the guide apparatus are shown. Here, a perspective view of an embodiment of a centrifugal separator 1 is illustrated in each case on the left. The centrifugal separator has a housing wall 23, which comprises conical or sleeve-shaped sections. For example, the centrifugal separator can be configured as illustrated in the cross-sectional view of FIG. 13. A particle discharge window 26 is illustrated in each case, and an exemplary guide blade is designated by the reference number 3. Moreover, the core 16 can be seen. The perspective illustrations in the FIGS. 16a, 17a show a view from above onto the guide apparatus or into the inflow opening of the centrifugal separator 1.

Figure 16B:
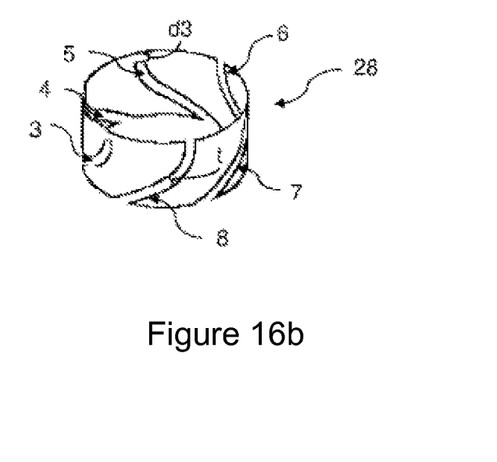
Figure 17A:
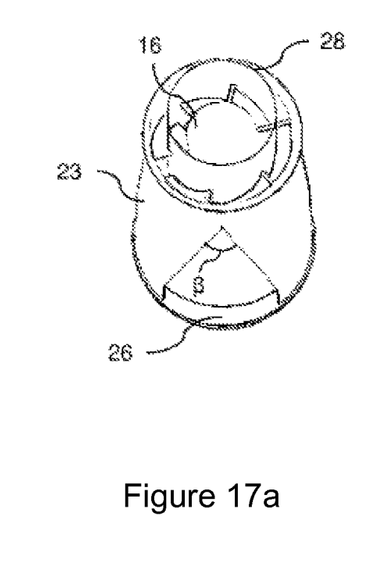

In FIG. 17a, the opening angle β for the particle discharge opening 26 is indicated by dotted lines. In the FIGS. 16a, 16b to 18a, 18b, in each case on the right side, the section views along the section lines 28 with the guide blade geometries are shown, wherein the section lines 28 are indicated on the left side in the FIGS. 16a, 17a, 18a. FIG. 16b shows a section line 28 similar to a cylinder jacket at the core 16 around the core. In FIG. 17a, a section line 28 approximately midways between the housing wall 23 and the core 16 is shown, and in FIG. 18a, a section line 28 is shown at the inner side of the housing wall 23 where the guide blades are.

Figure 17B:
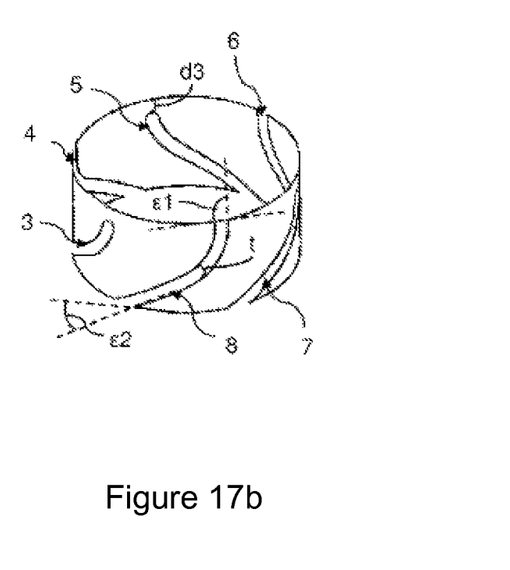

FIGS. 16b and 17b on the right side show the guide blades 3, 4, 5, 6, 7 and 8. Thus, exactly six guide blades are provided. Here, the guide blades 4, 6 and 8 are longer than the guide blades 3, 5 and 7. The guide blades 3, 5 and 7 are shorter by the offset d3.

Figure 18A:
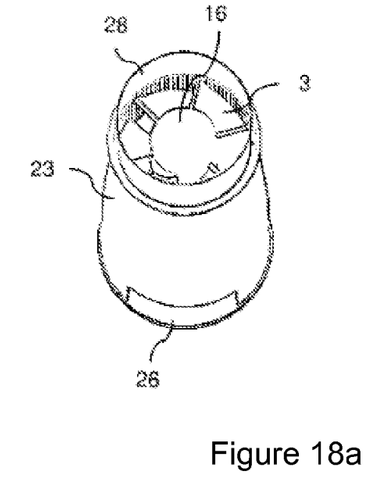
Figure 18B:
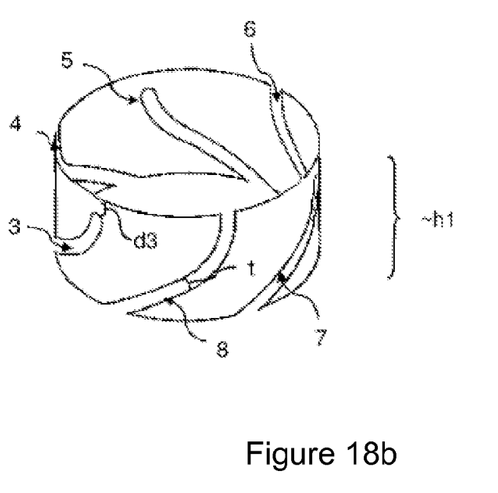

Moreover, angles of attack $\epsilon 1$, $\epsilon 2$ are indicated in particular in FIG. 17b. In the notation of the FIGS. 16a, 16b to 18a, 18b, an angle of attack $\epsilon$, in relation to a cross-sectional area, is perpendicular to the symmetry axis of the centrifugal separator 1. The sum of an angle of attack $\epsilon$ in relation to a cross-section and the blade angle $\alpha$ in relation to the longitudinal axis adds up to 90 degrees. The angle of attack $\epsilon 1$ in the embodiment as illustrated in FIG. 17b is greater than the angle of attack $\epsilon 2$, for example. In the orientation of the Figure, the angle $\epsilon 1$ is on the inflow side and the angle $\epsilon 2$ is on the outflow side. Furthermore, a thickness t of the guide blades is indicated in each case. Moreover, the height h1 of the guide apparatus is illustrated in FIG. 18b.

Optimizing with regard to the separation properties of the cyclone separator 1 can be carried by spreading the blade angles. For example, the respective angle of attack $\epsilon$ at the core (cf. FIG. 16b) can be greater than the angle of attack in the region of the housing wall (cf. FIG. 18b). This can result in a spread of the angle of attack of, for example, 30°. In FIG. 17b, a mean angle of attack of approximately 45° is indicated. Thus, the angle of attack or also the blade angle changes from the core towards the housing wall of a respective guide blade. Mean angles of about 45° have proved to be advantageous blade angles or angles of attack.

Figure 19:
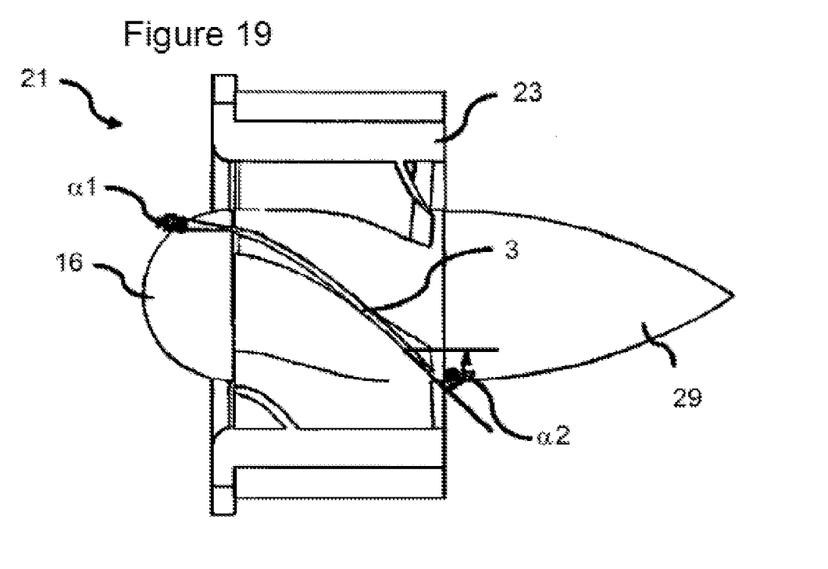
FIG. 19 shows a side view of a further embodiment of the guide apparatus.

FIG. 19 illustrates a side view of another embodiment of a guide apparatus. Here, the core 16 has an approximately round dome on the inflow side, and on the outflow side, it has a trailing hub 29 that extends beyond the guide apparatus. The profile of the core can also be adapted further. The trailing hub 29 influences a swirling or flow separation in an advantageous manner. Furthermore, an exemplary guide blade 3 is shown in FIG. 19. The blade angle of the guide blade 3 changes along the fluid flow. The angle between the guide blade and the longitudinal or symmetry axis of the centrifugal separator is designated here as the blade angle $\alpha 1$. On the inflow side, the angle $\alpha 1$ is, for example, approximately 10° and increases in the direction towards the outflow side to a blade angle $\alpha 2$ of approximately 50°. An increasing blade angle results in a better swirling and therefore in stronger centrifugal forces acting on the particles. Thus, the degree of separation is influenced in an advantageous manner. Furthermore, the profile of the guide blade 3 can be adjusted with regard to its thickness.

Figure 20:
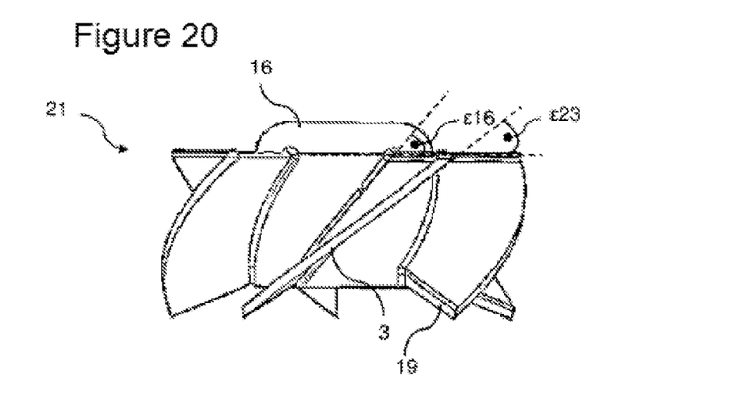
FIG. 20 shows a side view of a further embodiment of the guide apparatus.

Finally, FIG. 20 shows an example of an embodiment of a guide apparatus 21. In the orientation of FIG. 20, the inflow side is on top and the outflow side is at the bottom. The example of the guide blade 3 in the middle shows that the angle of attack $\epsilon 16$ at the core is greater than the angle of attack $\epsilon 23$ at the housing wall. Furthermore, it can be seen that the guide blades 3 have an inclined trailing edge 19. In the state inserted in a housing, the respective guide blade 3 has a greater length at the housing than at the core. This is also called a progressive blade end, which can result in a further improvement of the separation properties of a centrifugal separator.

Figure 21A:
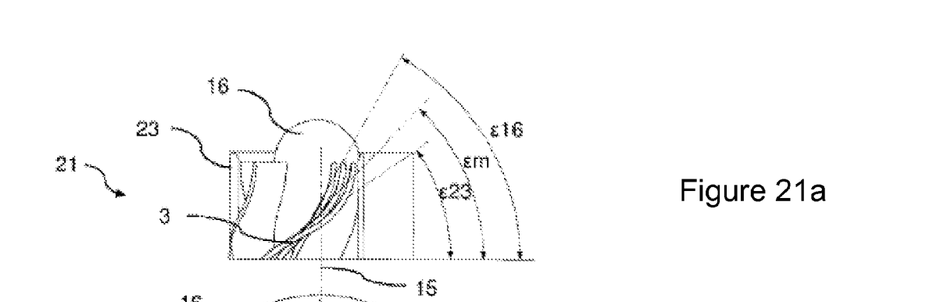
FIG. 21a shows a perspective view and FIG. 21b a sectional view of a guide apparatus for illustrating angular spreads.
Figure 21B:
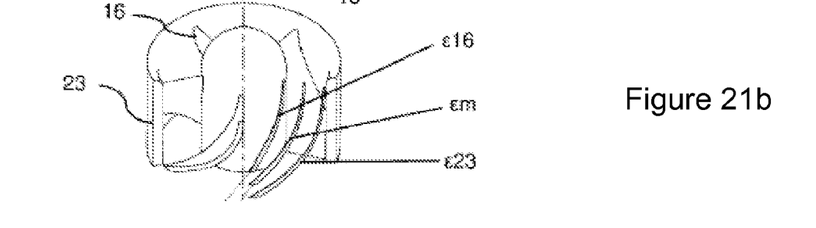

FIG. 21a illustrates a section view and FIG. 21b a perspective view of a guide apparatus the possible angle situations. The illustration is similar to the guide apparatuses shown in the FIGS. 16-18. A guide apparatus 21 is illustrated that has a core 16 and a housing wall 23 as well as guide blades provided therebetween, wherein a guide blade 3 and its profile is viewed in more detail. FIGS. 21a, 21b also show the longitudinal axis 15 of the guide apparatus.

The angle of attack at the core 16 is $\epsilon 16$, and at the housing 23, the angle of attack is $\epsilon 23$. The blades are in particular constructed in the shape of a spiral staircase that has different angles of attack and/or blade angles at the core and at the jacket or the housing wall. The difference between $\epsilon 16$ and $\epsilon 23$ is also referred to as angle spread $\Delta \epsilon$.

Furthermore, a mean angle of attack $\epsilon m$ can be defined, which extends approximately midways between the core wall and the inner wall of the housing. A suitable definition for the mean angle of attack is: $\epsilon m = (\epsilon 23 + \epsilon 16)/2$.

Possible angles of attack range between $\epsilon 16 \approx 80°$ and $\epsilon 23 \approx 20°$. The angle spread $\Delta \epsilon$, which results from the inner and outer angles of attack, has a specific influence on the performance data of a corresponding guide apparatus.

Figure 22:
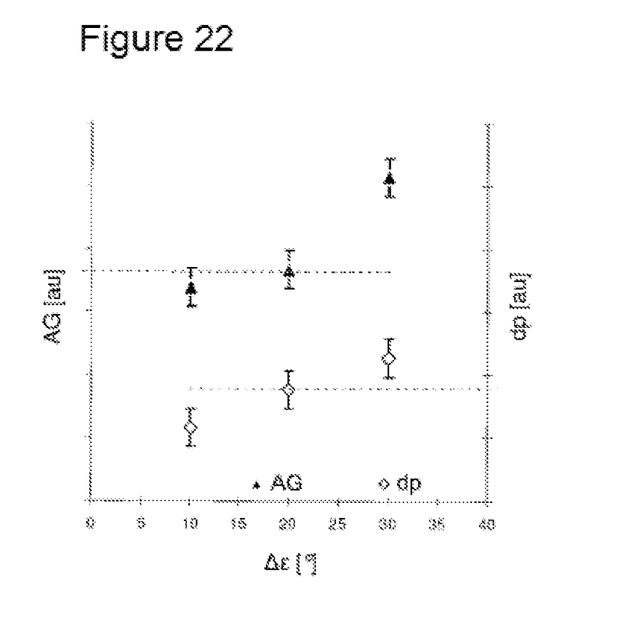
FIG. 22 shows a degree of separation and pressure loss as a function of an angular spread in embodiments of the centrifugal separator.

FIG. 22 shows the degree of separation AG and the pressure loss dp in each case in arbitrary units as a function of the angle spread Δε. It can be seen that by implementing the angle spread Δε, the degree of separation AG increases; however, at the same time, the pressure loss increases. Studies of the applicant have shown that an angle spread between 15° and 35° involves acceptable pressure losses and results in a good filtering effect. Particularly good filtering results are obtained at an angle spread between 20° and 30°.

Figure 23:
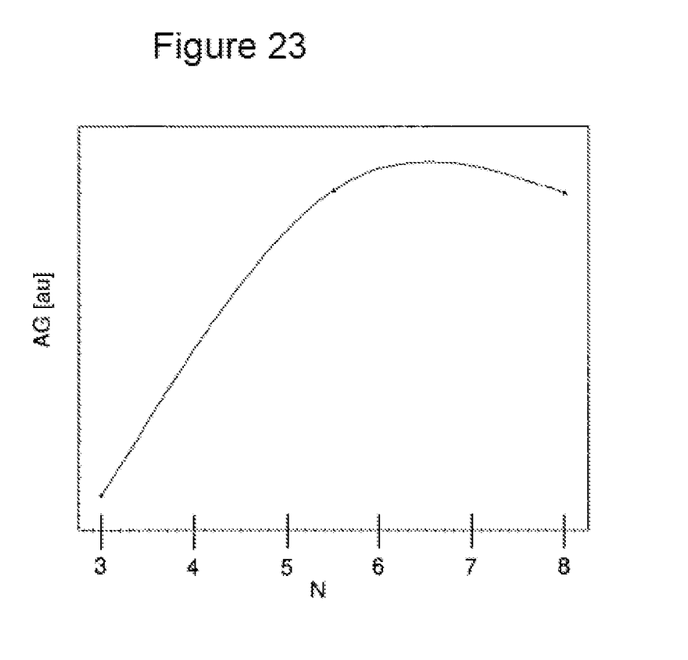
FIG. 23 shows a degree of separation as a function of a number of blades in another embodiment of the centrifugal separator.

Furthermore, the applicant performed studies about the dependency of the efficiency of centrifugal separators on the number of blades used in the guide apparatus. FIG. 23 shows a diagram for the degree of separation AG as a function of a number N of blades for another embodiment of the centrifugal separator. The degree of separation AG is indicated in arbitrary units. The curve corresponds to an embodiment in which the core diameter corresponds to approximately 15.5 mm and the blade angle $\epsilon \cong 45°$. It can be seen that in this configuration, a maximum degree of separation is obtained at a number of blades between N=6 and N=7. Thus, in particular centrifugal separators with six guide blades are preferred. Together with, for example, alternately shortened guide blades and/or an angle spread of the angles of attack or blade angles, particularly efficient centrifugal separators with advantageous degrees of separation and pressure losses are obtained when the fluids to be cleaned flow through. The indicated measures with regard to shortened blades, angle spread, shape of the discharge window and/or geometry of the immersion tube interact in a potential and synergetic manner and result in a filter devices that can be manufactured in a simple manner and have a good filtering efficiency.

Even though the present invention has been described based on various examples and aspects of centrifugal separators, it is not limited thereto but can be modified in various ways. In particular, the various aspects discussed in the Figures and the exemplary embodiments can be combined with each other. It is not absolutely necessary to provide guide blades of different lengths. Simply adjusting the angles of attack, blade angles, lengths, widths, or ratios between core diameters and housing diameters can result in improvements of cyclone separators. Furthermore, the mentioned numbers and numbers of guide blades are to be understood as examples only. For examples, values between 2 and 10 can be used for the guide blades. The materials of the centrifugal separators can be adapted to the respective fields of use. In particular, plastics suitable for injection molding are conceivable.

While specific embodiments of the invention have been shown and described in detail to illustrate the inventive principles, it will be understood that the invention may be embodied otherwise without departing from such principles.

What is claimed is:

1. A centrifugal separator for separating particles from a fluid, the centrifugal separator comprising:
a tubular housing comprising an inflow opening at a first axial end of the housing and an outflow opening at an opposing second axial end of the housing;
wherein the tubular housing surrounds a longitudinal axis extending though the housing from the inflow opening to the outflow opening;
wherein an axial, as used herein, is a direction parallel to the longitudinal axis;
wherein a radial, as used herein, is a direction traverse to the longitudinal axis;
an axial core arranged in an interior of the tubular housing and elongated along the longitudinal axis;
guide blades, including a first guide blade and a second guide blade, each guide blade extending radially between the axial core and a radially inner side of the tubular housing;
where the guide blades are for generating a turbulent flow in a fluid flowing into the housing through the inlet opening, wherein the guide blades each have a leading edge;
wherein the guide blades are each arranged stationarily;
an immersion tube arranged within the housing, extending axially from the outflow opening towards the inflow opening;
wherein the leading edge of the first guide blade has a first spacing relative to a cross-sectional plane of the housing and the leading edge of the second guide blade has a second spacing relative to said cross-sectional plane of the housing, said cross-sectional plane substantially perpendicular to an inflow direction of the fluid, wherein the first spacing and the second spacing are different from each other such that the leading edge of the first guide blade is spaced axially away from the leading edge of the second guide blade relative to the longitudinal axis.

2. The centrifugal separator according to claim 1, wherein the first and second guide blades each have a length and the lengths differ from each other.

3. The centrifugal separator according to claim 1, wherein on an inflow side of the housing, the first guide blade has a first distance from the inflow opening in a fluid flow direction of the fluid and the second guide blade has a second distance from the inflow opening in the fluid flow direction of the fluid, wherein the first and second distances are different.

4. The centrifugal separator according to claim 1, wherein the housing is tubular, wherein the guide blades and the axial core form together a cylindrical guide blade apparatus inserted into the tubular housing.

5. The centrifugal separator according to claim 1, wherein a thickness of at least one of the guide blades changes from the core toward the housing wall.

6. The centrifugal separator according to claim 1, wherein an angle of attack of at least one of the guide blades changes from the core toward the housing wall.

7. The centrifugal separator according to claim 1, wherein the core is longer than the guide blades in an axial direction of the housing.

8. The centrifugal separator according to claim 1, wherein the core has a diameter and the core is spaced apart from the housing wall at a core spacing,
wherein a ratio of the core diameter to the core spacing is between 2 and 4.

9. The centrifugal separator according to claim 1, wherein the guide blades each have a length,
wherein a thickness of at least one of the guide blades changes along the length.

10. The centrifugal separator according to claim 1, wherein
the guide blades each have a length,
wherein an angle of attack of at least one of the guide blades changes along the length.

11. The centrifugal separator according to claim 1, wherein
an inflow profile of at least one of the guide blades is curved.

12. The centrifugal separator according to claim 1, wherein
exactly six of the guide blades are provided.

13. The centrifugal separator according to claim 1, wherein
the guide blades do not overlap each other in any cross-sectional plane perpendicular to an inflow direction of the fluid.

14. The centrifugal separator according to claim 1, wherein
a cross-sectional area of the housing increases in the flow direction of the fluid.

15. The centrifugal separator according to claim 1, further comprising
an immersion tube arranged in the housing,
wherein the immersion tube tapers from the outflow opening in the direction toward the inflow opening.

16. The centrifugal separator according to claim 15, wherein
the immersion tube has an immersion plate and is secured with the immersion plate at the outflow opening.

17. The centrifugal separator according to claim 15, wherein
the immersion tube is spaced apart from the guide blades in an axial direction of the housing.

18. The centrifugal separator according to claim 1, wherein
the housing has a housing wall provided with a particle discharge window,
wherein the particle discharge window opens a predetermined angular section in a housing wall relative to a longitudinal axis of the housing.

19. A filter device comprising:
a filter device housing comprising a plurality of filter device housing openings;
several centrifugal separators of claim 1 disposed in the filter device housing, wherein the inflow openings of the centrifugal separators are connected to the filter device housing openings, respectively;
the filter device housing comprising an outflow section separated fluid-tightly from the filter device housing openings;
wherein the outflow openings of the centrifugal separators are coupled to the outflow section.

20. The filter device according to claim 19, comprising
a discharge section that is separated fluid-tightly from the inflow openings and from the outflow section,
wherein the discharge section communicates with particle discharge windows of the centrifugal separators.

* * * * *